United States Patent [19]
Glenn

[11] Patent Number: 6,077,361
[45] Date of Patent: Jun. 20, 2000

[54] METHOD AND APPARATUS TO REMOVE AT LEAST ONE SUBSTANCE FROM A SURFACE USING A PRESSURIZED FLUID

[76] Inventor: Kenneth R. Glenn, 8471 NW. 24th Ct., Sunrise, Fla. 33322

[21] Appl. No.: 09/108,169

[22] Filed: Jun. 30, 1998

[51] Int. Cl.[7] ........................................................ A47L 1/02
[52] U.S. Cl. .............................. 134/21; 15/302; 15/313; 134/34; 134/37
[58] Field of Search ....................... 15/250.001, 250.002, 15/250.003, 302, 313, 405; 134/21, 34, 37

[56] References Cited

U.S. PATENT DOCUMENTS

| | | | |
|---|---|---|---|
| 1,448,508 | 3/1923 | Thum | 15/313 |
| 3,295,004 | 12/1966 | Hirsch | 15/250.002 |
| 3,939,523 | 2/1976 | Kolbe et al. | 15/250.002 |
| 5,409,287 | 4/1995 | Suzuki | 15/313 |
| 5,419,005 | 5/1995 | Mori | 15/313 |
| 5,486,139 | 1/1996 | Papp | 15/313 |
| 5,852,846 | 12/1998 | Gonzalez | 15/313 |

FOREIGN PATENT DOCUMENTS

| | | | |
|---|---|---|---|
| 2555113 | 5/1985 | France | 15/250.001 |
| 2338597 | 2/1975 | Germany | 15/313 |
| 60-8139 | 1/1985 | Japan | 15/313 |
| 4-201766 | 7/1992 | Japan | 15/313 |
| 63-269761 | 11/1998 | Japan | 15/313 |

*Primary Examiner*—Terrence R. Till
*Attorney, Agent, or Firm*—Gunster, Yoakley & Stewart, P.A.

[57] ABSTRACT

A method to remove substance from a surface includes the steps of: pressurizing a fluid to produce a pressurized fluid; mounting a manifold with at least one input port for receiving said pressurized fluid thereinto and said manifold further comprising at least one output port over said surface; and directing said pressurized fluid to flow over said surface so as to remove at least part of said substance on said surface.

19 Claims, 8 Drawing Sheets

METHOD AND APPARATUS TO REMOVE AT LEAST ONE SUBSTANCE FROM A SURFACE USING A PRESSURIZED FLUID

CROSS-REFERENCE TO RELATED APPLICATIONS

Not applicable

BACKGROUND OF THE INVENTION

1. Field of the Invention

The invention disclosed broadly relates to the field of vehicle windshield cleaning systems and more particularly relates to the removal of substances using pressurized fluids from vehicle glass and mirror surfaces.

2. Description of the Related Art

The build up of "road grime" on motor vehicle and non-motorized vehicle surfaces such as windshields, mirrors, side view mirrors, rear windows, motor cycle fairings, motorcycle helmet face-shields, headlights, taillights and any other surface on a vehicle is problem. Road grime is any foreign substance including water, dirt, pollution, pollen, salt, and insects or equivalent that reduce the visibility through a surface such as a windshield. Road grime can be any combination of foreign substances such as dirt combined with water or simply one foreign substance such as water by itself. The reduction in the ability to see through transparent surfaces is hazardous and can greatly reduce the operational safety of a motor vehicle. Other substances such as water from rain or lawn sprinklers also decrease the visibility through a surface not only by reducing light transmission but also by distorting images.

One solution to remove water droplets from vehicle surfaces, such as windshields for automobiles, boats, planes and even the U.S. Space Shuttle is the use of windshield waxes such a RAINEX brand windshield treatment. Windshield waxes and equivalent products work by causing water to bead-up on a windshield surface. The beading water is blown off by the aerodynamic effects of air flow across the windshield when running the vehicle. The windshield wax system works well at highway speeds but as the vehicle's speed decreases, the resulting aerodynamic flow of air decreases which in turn reduces the effectiveness of removing the beading water. Moreover, as with any wax coating on a surface, windshield wax is worn away by the elements of weather. As the wax coating wears out, the effectiveness of the water beading decreases. Accordingly, a need exists for a system to remove water droplets from a vehicle surface that overcome these problems.

Another solution to clear windshields is windshield wipers. In fact windshield wipers are used on everything from airplanes to yachts. One class of vehicle which has not had great success in integrating windshield wiper technology is motorcycles and personal water crafts. These vehicles with small fairing or no fairing are especially ill suited for windshield wiper use. Operators of motorcycles wear goggles or face-shields attached to helmets. Windshield wiper motors, along with the mechanical linkages and the accompanying power sources are not only unsightly if attached to a motorcycle helmet, but these components can add a pound or more of the weight to the helmet itself. The additional weight pressing down on the head can be uncomfortable to users, especially on long trips. Therefore, a need exists to provide a solution to clean off face-shields, fairings, goggles and other surfaces without the weight and unsightly appearance of windshield wipers.

Other motor vehicle and non-motor vehicle transparent surfaces besides windshields employ windshield wiper technology. These transparent surfaces include headlights and rear windows. Windshield wiper technology requires the use of electrical motors and corresponding motorized linkages. The cost of the electrical motor can be prohibitive, especially in applications other than windshields such as the removal or road grim off of head lights, tail lights or side view mirrors. The use of windshield wiper technology depends on the rubber blades of the wipers being in good condition and pliable. Many times, the blades on the wipers are not changed and the effectiveness of the removal is decreased. The use of windshield wipers are many times also hampered by the weather. Build-up of frost, snow, and ice severely limits the effectiveness of windshield wipers. The cold weather may freeze the windshield wiper blade to the windshield or freeze the windshield wiper mechanical linkages. This render the windshield wiper inoperable. When the weather is dry, dirt trapped on windshield wiper blades can permanently scratch a windshield, especially when the windshield wipe-blade is dragged over a dry surface. Moreover, windshield wiper blades protrude even in the off position and are prone to being damaged by automated car wash equipment. Therefore, a need exists to provide a substance removal system that can augment the use of wiper blades to overcome these limitations.

Another solution that exists for helmet wearers is the use of squeegee systems. Squeegee material or other material such as suede cloth is fastened to the user's finger. The squeegee or suede cloth can also be integrated into a rider's glove. These devices necessitate that the driver take one hand off the handle bars and swipe his face-shield with the squeegee attached to his finger. This system may be effective, but the requirement to momentarily let go of the handlebars with one hand while operating a vehicle is undesirable and in many circumstances dangerous. The squeegee or cloth system can be especially hazardous in heavy rain. The frequency to swipe a motorcycle's face-shield or goggles must increase and therefore the frequency the driver must remove his hand while operating the vehicle correspondingly increases. Moreover, many cloth systems become saturated after a few uses, and the ability to remove water and other substances off a surface is greatly diminished. Accordingly, a need exists for a system to clear face-shields, goggles and fairing to overcome these problems.

Still, another method for removing road grim on motorcycle face-shields is called tear-offs. Tear-offs are thin sheets of transparent plastic material, such as acrylic, that are layered one sheet on top of another over the face-shield and fastened at each end. The use of tear-offs is especially common in off road racing or motor-cross racing where the motorcycle driver reaches up and tears off a layer of the plastic as the layer becomes covered with road grim. The tear-off system is very effective in the off-road environment with mud and dirt. But this system like the squeegee or cloth system requires that the rider take a hand off the handlebars when removing a strip. Moreover, the system does not work well in the rain because of the limited number of strips, and the proclivity of water to get trapped in between the layers of the tear offs and caused distortion of the rider's view. Therefore, a need exists to provide a system for removing "road grime" including water that is not limited by the number of layers of plastic sheets attached or that requires the driver to remove a hand from the handlebars to tear off a sheet.

Still another method for removing road grim on motorcycle face-shields is automated transparent film advancement systems. These systems work like convention 35 mm camera film advancement mechanisms where a motor driven spools draws film from a supply spool. The film is guided over the front of the face-shield as film is guided over the aperture of a camera. The film is a transparent plastic film. Whenever the current plastic film surface is soiled by road grim, the rider activates a motor to advance the film over the face-shield area. This apparatus, like the windshield wiper is unsightly and heavy. As mentioned for the tear off, this method is limited by the amount plastic film and this method has the proclivity of getting water trapped between the film and face-shield blurring the driver's view. Finally, this system is not effective in heavy rain because the film supply is limited and will run out after a set number of advancements. Accordingly, a need exists for providing a substance removal system that will overcome these problems.

Unfortunately, several surface areas on vehicles experience static, neutral or even slightly lower areas of air flow. In fluid dynamics this is sometimes referred to as boundary-layer separation or just simply fluid separation. This can occur at boundary areas such as the lower edge on an automobile windshield where the windshield meets the hood of the car. In many automobile designs, this is the area along the bottom of the windshield where the windshield wipers are stored when the wipers are in the off position. These static areas become more pronounced as the vehicle increases in speed. Road grim becomes trapped in these regions where boundary-layer separation occurs. This buildup of road grim in these area reduces the visibility through these areas. Therefore a need exists to control the boundary-layer separation areas to more effectively reduce the buildup of road grim.

SUMMARY OF THE INVENTION

Briefly, in accordance with the present invention, disclosed is a method to remove substances from a surface includes the steps of: pressurizing a fluid to produce a pressurized fluid at the surface; mounting a manifold with at least one input port for receiving said pressurized fluid there into and said manifold further comprising at least one output port; and directing said pressurized fluid to flow over said surface so as to remove at least part of said substance on said surface.

DETAILED DESCRIPTION OF AN EMBODIMENT

Figure 1:
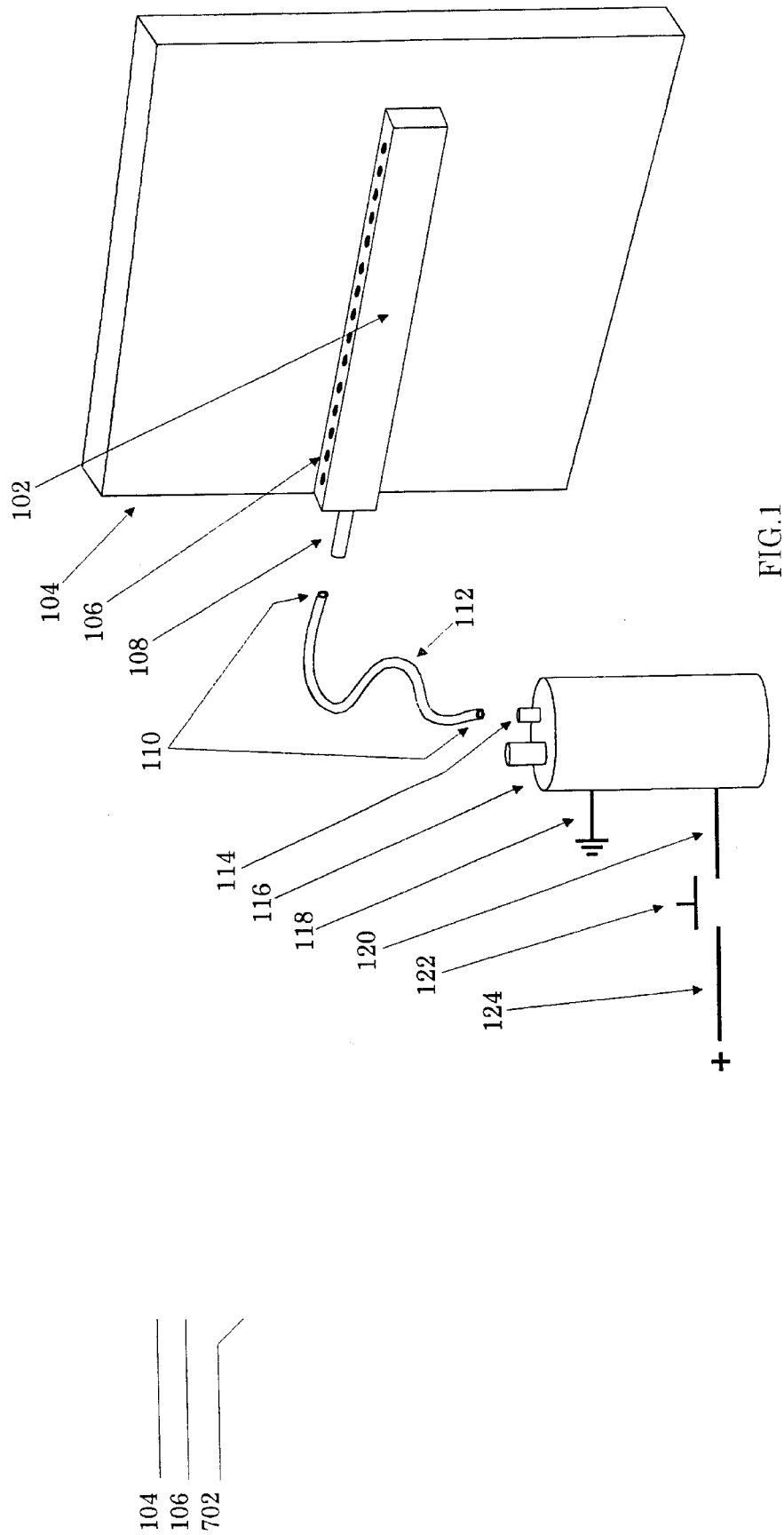
FIG. 1 is a perspective view of an external manifold according to the present invention.
Figure 2:
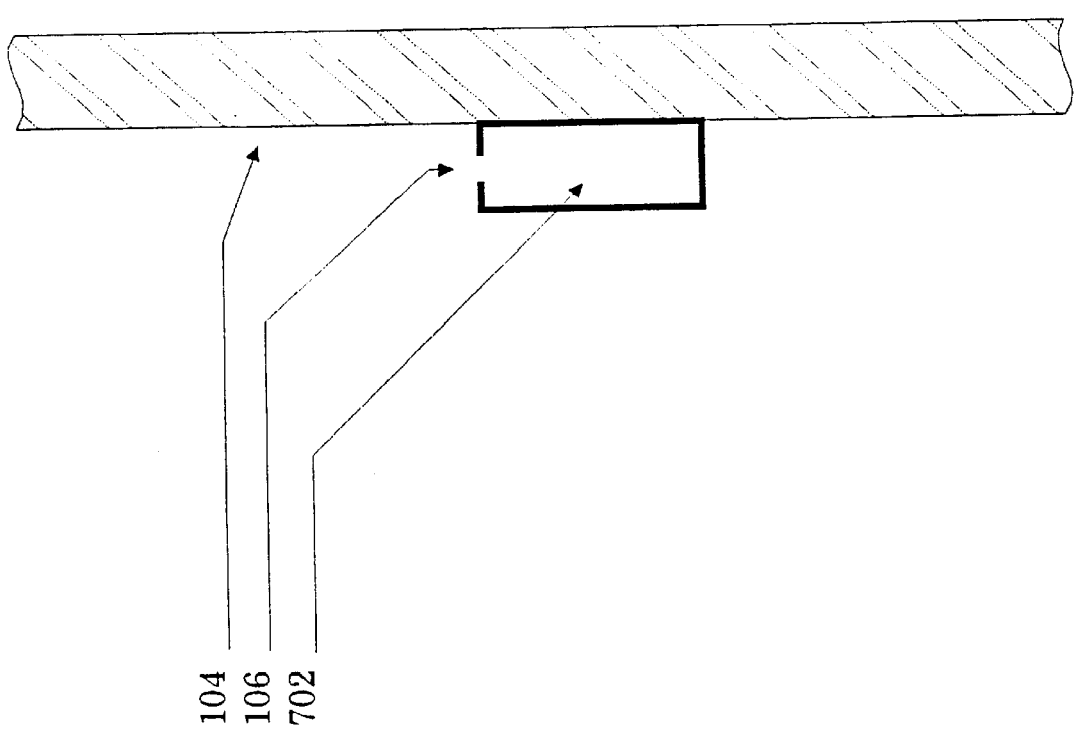
FIG. 2 is a cross-sectional view of an external manifold of the present invention corresponding to FIG. 1.

FIG. 1 depicts perspective view of an external manifold according to the present invention 100. A surface 104 is shown. FIG. 2 is a cross-sectional view of an external manifold 200 of the present invention corresponding to FIG. 1. The surface is composed of any transparent material such as safety glass, tempered glass, plastic or acrylic or any similar transparent material for constructing windshields, windows, face-shields, head lamps, tail lamps, mirrors or any other vehicle surface whose primary purpose is to pass light, direct light or reflect light. Manifold 102 comprises at least one input port 108 and one or more output port(s) 106. Manifold 102 can be constructed from any of a variety of synthetic and natural materials including, plastic, glass, metal, rubber or equivalent materials. In the preferred embodiment, the manifold 102 comprises a transparent material such as clear plastic. The use of transparent material has several desirable effects. First the use of transparent material minimized any decrease in light transmission through the surface 104 coupled to the manifold 102. Second, the use of transparent material minimizes an obstruction with an operator's field of view. And Third, the use of transparent material for many applications is more aesthetically appeasing by not drawing attention to the manifold in view of the surface and the surrounding structure as a whole. It is important to note that the exact material for the manifold 102 and the color of the material for the manifold 102 is not crucial to the true scope and spirit of the present invention.

The construction of fluid distribution manifolds is known. The manifold is constructed so that pressurized fluid introduced into the input port 108 is distributed via a common internal cavity to the output port(s) 106. The path of the fluid exiting the output port(s) 106 can be altered by varying several different components: first by adjusting the shape of the manifold 102 itself; second, by adjusting the size and density of the hole(s) that comprise the output port(s) 106; and third through the use of internal contours or internal baffles (not shown). Another adjustment that can be made is to compensate for fluid pressure loss. Non-uniform pressure in the manifold 102 produces a correspondingly non-uniform spray pattern from the output port(s) 106.

In the preferred embodiment, the manifold 102 in the cross sectional view of FIG. 2 is rectangular. One of the shorter sides of the rectangle, or here the width, contains the output port(s) 106. A rectangular shape provides an expansion area, that is an, area in the manifold to permit the uniform build-up of pressure over the length of the manifold. In the experimental tests of the present invention, it was found a rectangular area with the height (¼") being twice the wide (⅛") provided a sufficient expansion area for a 4" long manifold. Other dimensions and geometric shapes for expansion areas are possible to achieve uniform fluid flow from output port(s) 106. Therefore the expansion area in this present invention is not limited to the dimensions or shape disclosed in this present embodiment.

Another method to compensate for the fluid pressure loss is achieved by changing the diameter of the openings or holes that comprise the output port(s) 106. Holes in the manifold 102 nearest the input port 108 are smaller in diameter than holes furthest away from the input port 108. The compensation of fluid pressure loss may be particularly relevant in applications where the length of the manifold can be several inches from an input port 108, such as a single continuous manifold used across an automotive windshield.

The use of more than one input port 108 can also be used to maintain a uniform pressure across the output port(s) 106, especially for applications requiring longer manifolds.

In another embodiment, the output port(s) 106 is constructed as one long continuous slit along one surface of the manifold 102. The size and orientation of slit may be varied to change the fluid flow exiting from output port(s) 106 over surface 104. And as previously mentioned, the uniformity of the spray pattern can be adjusted by tapering the width of the slit to be smaller at the end of the manifold 102 nearest the input port 108 and wider at the point furthest away from the input port 108.

Figure 3:
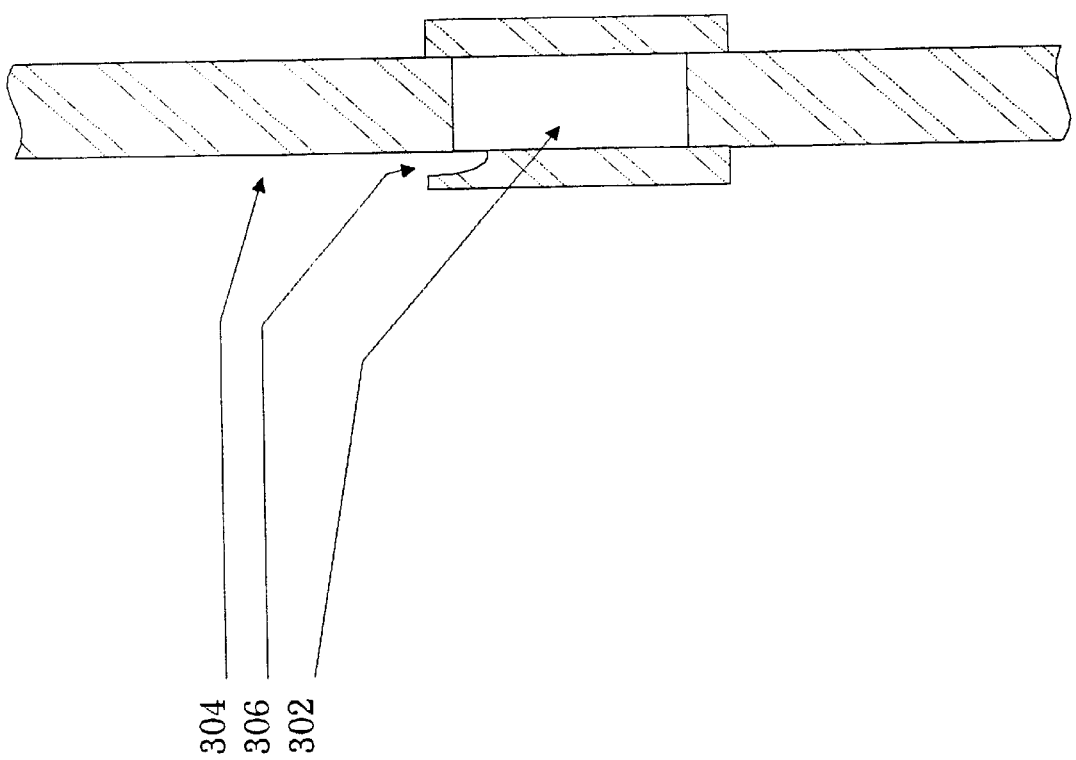
FIG. 3 is a cross-sectional view of an alternative embodiment for an integrated manifold according to the present invention.

Referring to FIG. 3 is a cross-sectional view of an alternative embodiment for an integrated manifold 300 according to the present invention. Unlike in FIG. 2, the manifold 302 is formed within, that is, integrated with surface 104. The output port(s) 306 is arcuate in shape for directing the pressurized fluid over the surface 104.

In the preferred embodiment, the pressurized source is any of a variety of pumps 116 capable of producing a steady pressure of 25 lbs. to 120 lbs. Commercially available pumps, such as pumps used for automotive applications such as air horns are available. The pump is powered from the vehicle's electrical system. The control of a simple pump from a power source is known. Shown is a negative terminal 118 and a positive terminal 124 with a series connected single pole switch 122. The activation of switch 122 completes the simple electrical circuit and the pump turns on. In one embodiment, the switch 122 is a momentary contact switch or equivalent and allows for the pump to be activated for very short periods of time to energize the pressurized source only briefly. Typically vehicle voltage systems are between 6 Volts DC and 12 Volts DC. The exact pump voltage and activation circuitry is not important. The pump pressure must be sufficient to remove any substance off a desired target area on surface 104. The pump capacity is directly related to the size of the area desired to be targeted and the dimensions including the size of the output port(s) 106 employed. It should be appreciated that many motor vehicle systems rely on fluid pumps. This is especially true for air and washer fluid. Air pumps for air shocks, air horns, air brakes and other air driven accessories are common on many motor vehicles. The availability of pumps in many motor vehicle applications, makes the integrating this present invention into many other existing motor vehicles very cost effective.

It should be noted that the use of the pressurize fluid itself and not a wiper blade such as an automobile windshield wiper is what removes the road grim. Windshield wipers combined with washer systems such as low pressure windshield washer nozzles are known. However, unlike the present invention, these factory installed windshield washer systems are not mounted close enough in proximity to the windshield surface, nor is the pressure sufficient to remove roadgrim without the aid of a windshield wiper.

In another embodiment, alternate pressurized fluid sources are used. Compressed air containers or aerosol canisters can supply the pressurized fluid for the system instead of pump 116. The use of compressed fluids may be desirable in applications where the availability of an electrical power source is not convenient such as on non-motorized vehicles including small sail boats, bicycles or hang gliders.

The pump outlet 114 is coupled to a tubing 112. The tubing 112 is rubber or plastic and appropriately matched to the pressure of the pump. The ends 110 of tubing 112 are attached to pump outlet 114 and input port 108 of manifold 102. The tubing ends can be secured using a variety of known techniques including using a simple compression fit. A compression fit is created when the size of the interior diameter of the tubing is just slightly larger than the exterior diameter of the pump's outlet 114 on one end and the exterior diameter input port 108 on the other end. Other well known coupling techniques are available including "quick release" air fittings, such as Sweglock brand fittings used in air powered tool applications. Still, other known mechanical coupling techniques for fastening ends 110 of tubing is through the use of hose clamps.

Manifold 102 is attached to surface 104 by double backed tape. The use of double backed tape enables the simple installation of the manifold on any surface by the user when the present invention is sold as an after market vehicle accessory. Other mounting methods for attaching manifold 102 to surface 104 include but are not limited to the use a any water proof adhesives, such as a clear epoxy, or through other means such as through use of brackets or fasteners that do not interfere with the fluid flow from output port(s) 106. The input port 108 is attached to a pressurized fluid source. There are several different types of fluids that can be pressurized to flow over surface 104 through manifold 102. The use of different fluids produces different desired results. The removal of water droplets on surface 104 is accomplished by using air as a fluid. The air acts to sweep away water droplets from the surface 104. Road grim can be removed from surface 104 through the use of cleaning solutions such as windshield washer fluid. In cold weather application, well-known antifreeze solutions can be added to the cleaning solutions to prevent freezing. In another embodiment, the fluid can be heated to a temperature higher than the temperature of the surface 104 in order to defog, defrost and remove any water deposits, water condensation, ice or snow. Heating fluids in vehicle applications can be accomplished through a variety of techniques. One known technique is through the use of a heat exchanger coupled to an engine cooling system such as radiator. Heat exchangers can be coupled to other engine heat sources such engine exhaust manifolds. Another technique is through the use of submersible electrical heating elements, placed in fluid reservoirs (not shown).

Figure 4:
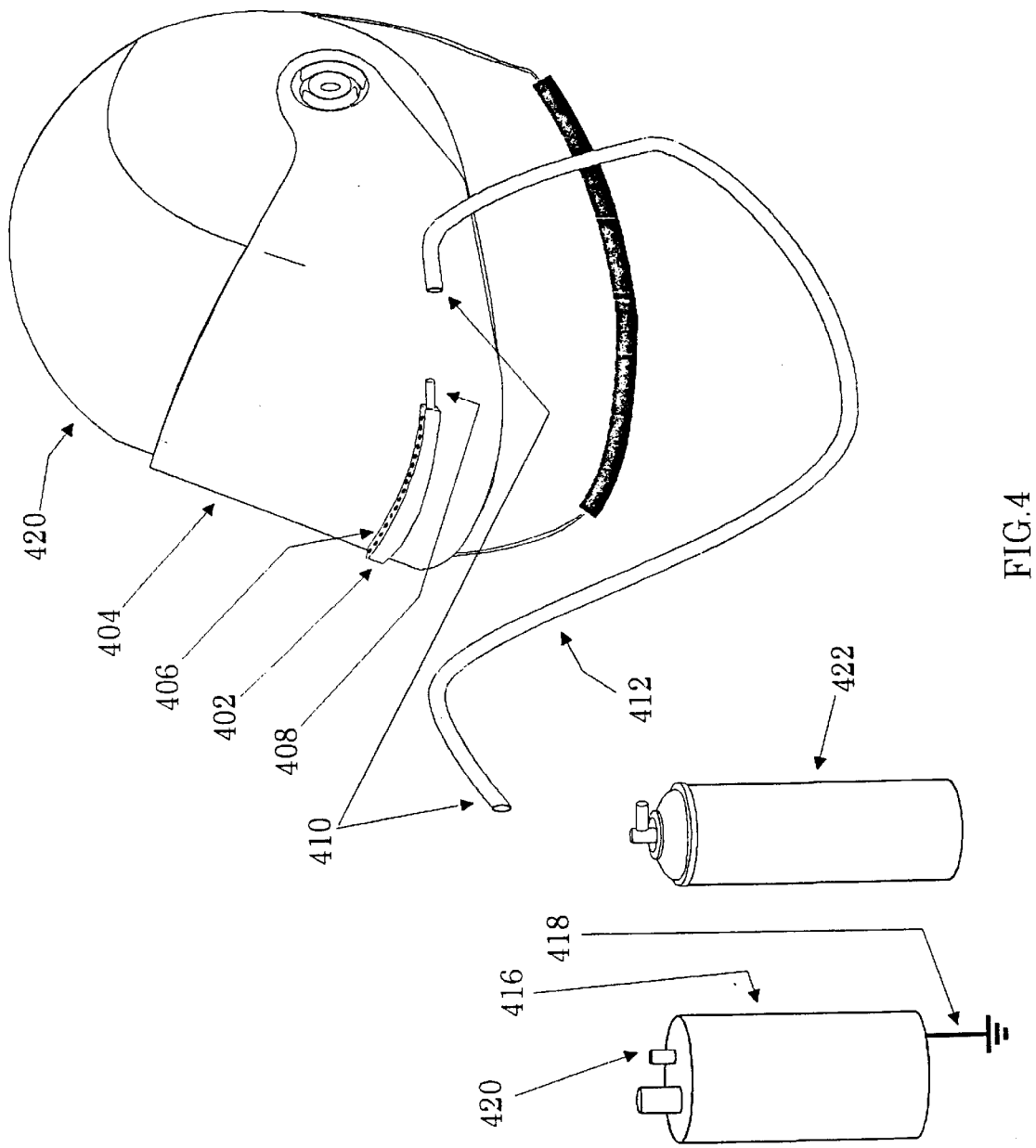
FIG. 4 is a functional diagram of the present invention for a manifold mounted on a face shield of a motorcycle helmet.

Referring now to FIG. 4 is a functional diagram of the present invention for a manifold mounted on a face shield of a motorcycle helmet 400. Helmet 420 is any motorcycle helmet from such manufactures as Shoei, Bell, Monarch and equivalent. The surface 404 is a plastic transparent face shield. The shape of manifold 402 is rectangular. The dimensions of manifold 402 are one eighth of an inch (⅛") wide by one quarter of an inch (¼") high by four inches (4") long. The output port(s) 406 in manifold 402 are evenly spaced along the narrower edge in close proximity to surface 404. The density of holes is about four holes per inch where each hole is sized to a number 60 (0.04") drill bit. The pressurized fluid is delivered to manifold 402 through tubing 412 from electrical pump 416. A momentary switch can be attached to the handle bars of the motorcycle (not shown) so that the pump 420 is activated without having to remove a hand from the handlebars. As shown in FIG. 4 a cannister of compressed gas, such as air, can be used in place of the pump 420.

Figure 5:
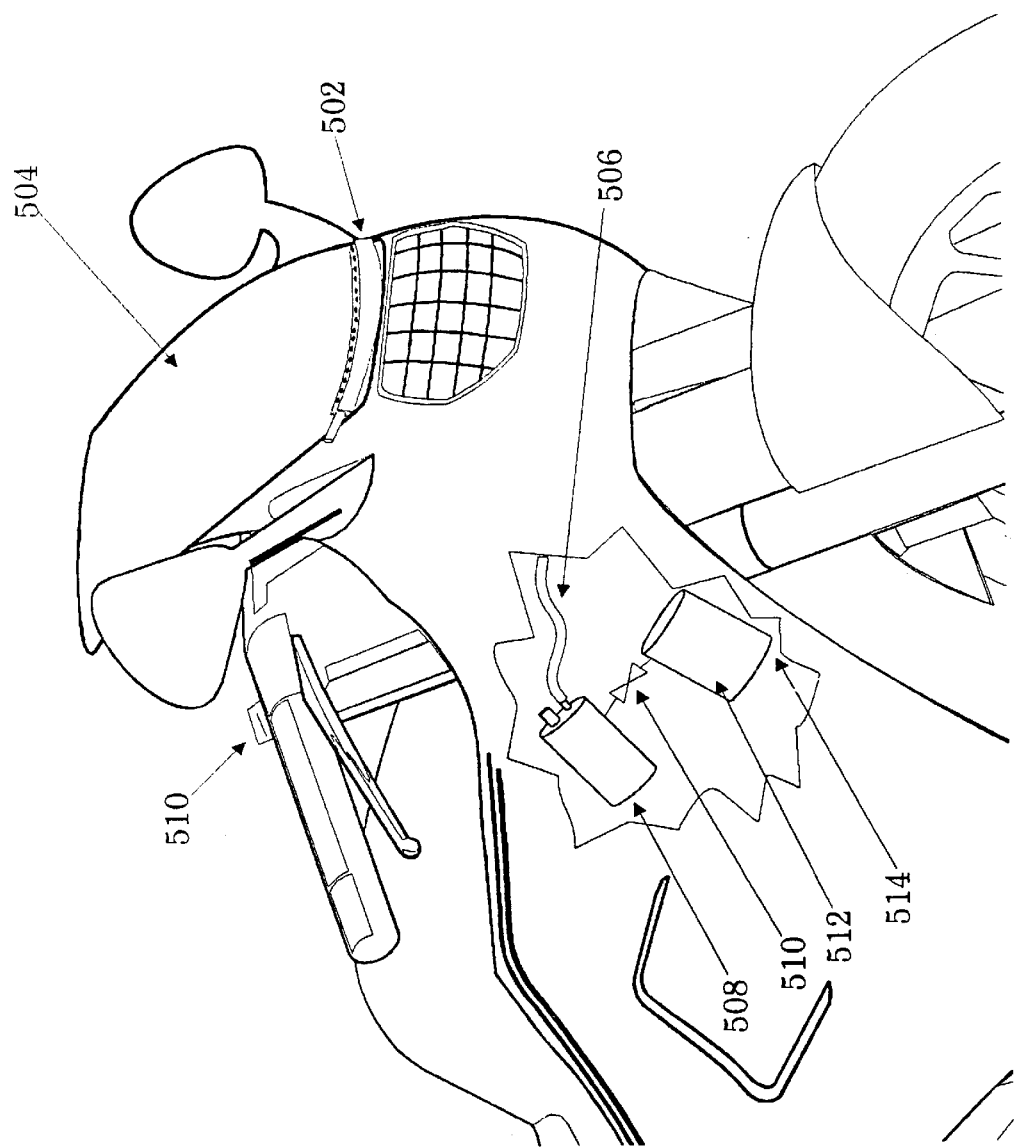
FIG. 5 is a perspective view of an alternative embodiment for a manifold mounted on a motorcycle fairing according to the present invention.

FIG. 5 is a perspective view of an alternative embodiment for a manifold mounted on a motorcycle fairing 500 according to the present invention. The manifold 502 is attached to a fairing 504. Tubing 506 delivers fluid from a pump 508. A handlebar switch 510 allows the driver to operate the pump 508 rom the handlebar. In another embodiment, multiple sources or reservoirs of fluid can be used to change the fluid as the conditions require. For example it would be easy to have the fluid be air in the default application for removal of water from a surface 504. When the conditions require, the surface 104 can be cleaned using the same manifold 504, the same pump 508 and same tubing 506 by introducing a cleaning solution 512 stored in reservoir 510 into pump 512 through a simple electronic valve assembly 514. The user can select to clear the surface 505 with air or to clean the surface 504 by directing cleaning solution through the same system through use of a remote electronic valve 514.

It is important to point out that this present invention is not limited to any specific motorized of non-motorized vehicle application. A wide range of motorized vehicles including: automobiles, motorcycles, boats, planes, trucks, buses, personal water craft (e.g., Jet Skis), airplanes, ultralights airplanes, scooters are contemplated. Applications for both civilian and military applications are contemplated in the present invention. In addition, many non-motorized vehicles such as bicycles, hang-gliders, and sailboats are also contemplated.

Figure 6:
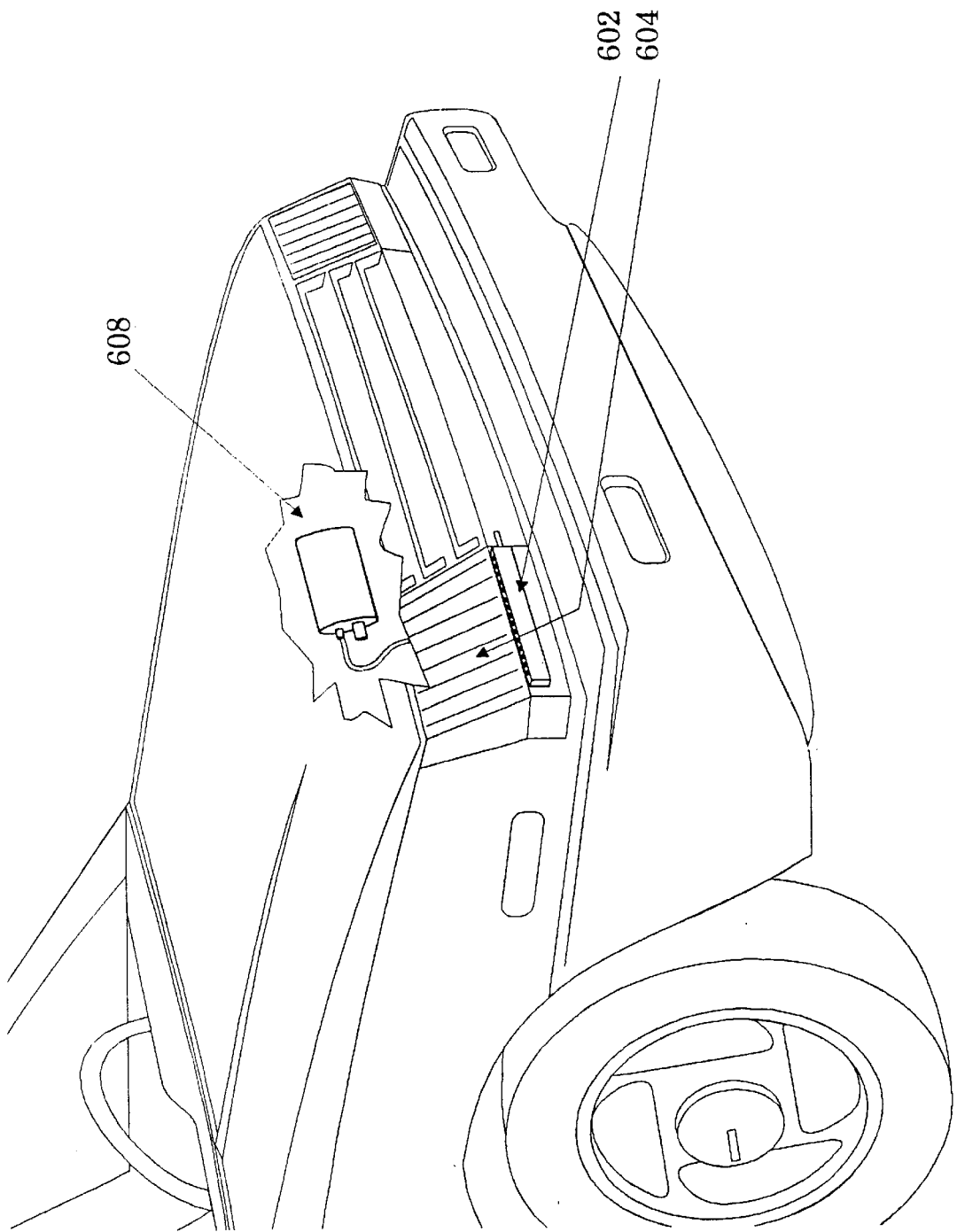
FIG. 6 is a perspective view of an alternative embodiment for a manifold mounted on an automobile head lamp according to the present invention.

FIG. 6 is a perspective view of an alternative embodiment for a manifold mounted on an automobile head lamp 600 according to the present invention. A manifold 602 is located just beneath a headlamp surface 604. Tubing 606 is routed to a pump 608. The fluid pump 608 is activated by an electrical switch 610 inside the driver's compartment.

Figure 7:
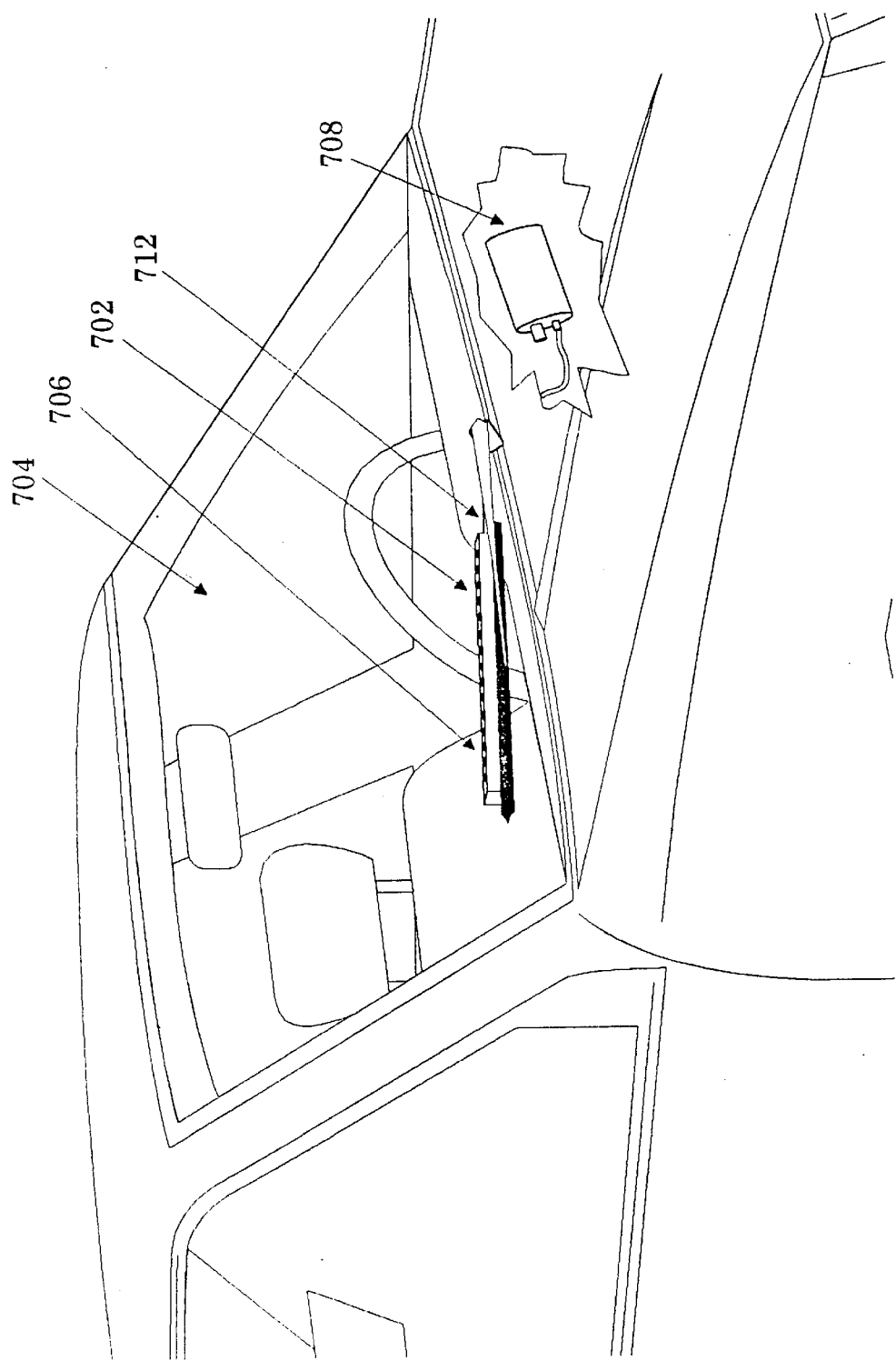
FIG. 7 is a perspective view of an alternative embodiment for a manifold mounted on a windshield wiper arm according to the present invention.

FIG. 7 is a perspective view of an alternative embodiment for a manifold mounted on a windshield wiper arm according to the present invention. A manifold 702 is attached to a wiper arm 712. Manifold 702 is positioned to direct fluid flow over surface 704. The manifold can augment the actions of the conventional windshield wiper arm in several ways. First, in circumstances where the water build-up on surface 704 is too light such as the presence of a light mist. The use of air as a fluid can remove water no matter how light the build-up on surface 704.

Another circumstance is where the action of a conventional wiper blade is augmented by the present invention is build up of frost on the surface 704. The use of heated air raises the temperature of surface 704 above freezing and melts away the build-up of frost on the outside of surface 704. Still another circumstances where the action of a conventional wiper blade is augment by the present invention is in the removal of road grim. The use of a pressurized cleaning fluid delivered through manifold 702 can remove stubborn road grim such as bird droppings or sap from trees. The pump 708 pressure is higher than the pressure for conventional windshield wiper washer mechanisms found on most automobiles. In addition, the output port(s) 706 are in close proximity to the surface 704 to be cleaned. In the preferred embodiment this is less than an inch away from the surface 704.

In still another embodiment, there are several surface areas on vehicles that experience static, natural or even slightly lower areas of air flow. In fluid dynamics this is sometimes referred to as boundary-layer separation area or just simply fluid separation area. This is especially true in areas such as the mirrored surface of side-view mirrors and the lower edge of a windshield where the windshield meets the hood of the vehicle.

Figure 8:
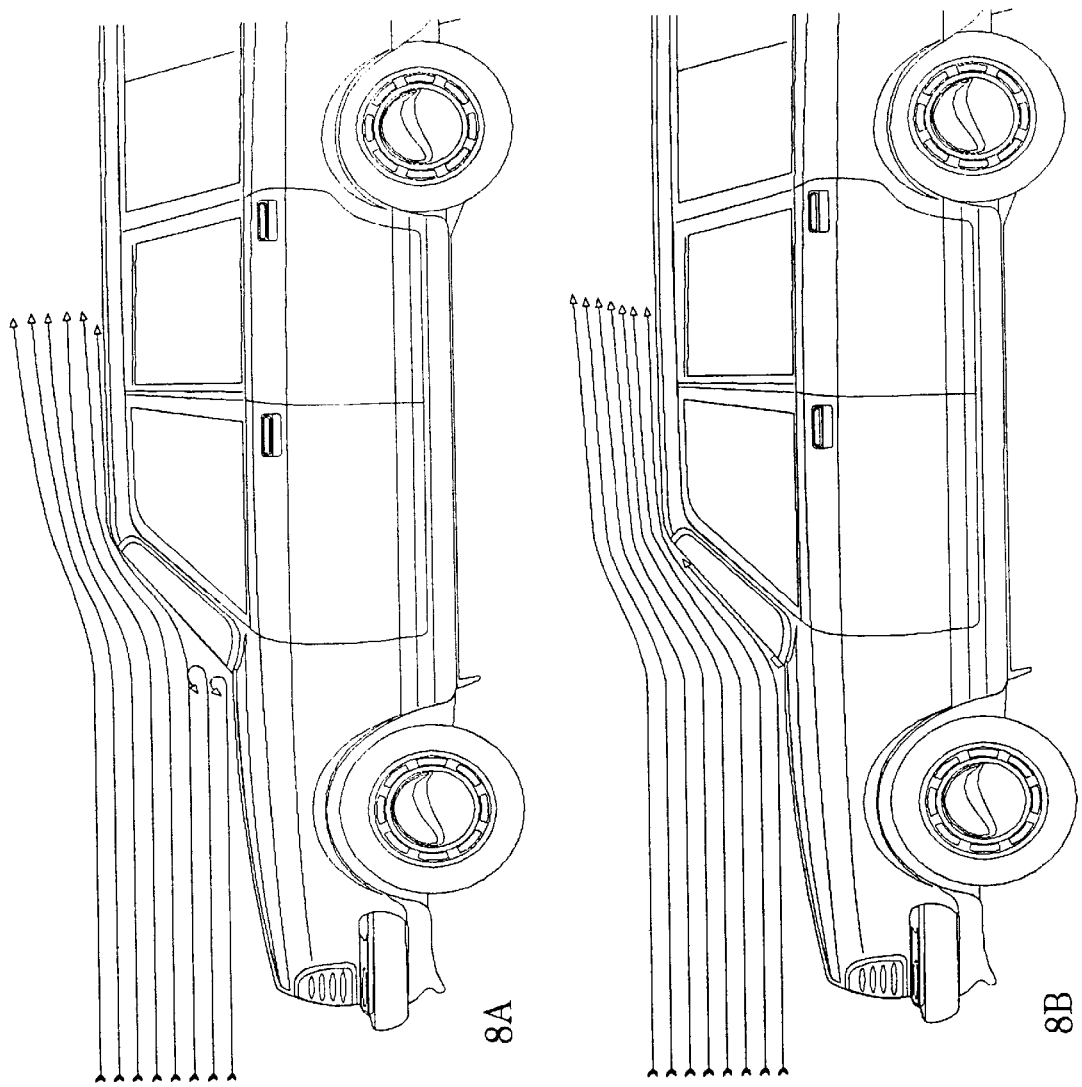
FIG. 8 is a perspective view of an alternative embodiment for a manifold illustrating the effect of fluid boundary-layer separation according to the present invention.

In FIG. 8 is a perspective view of an alternative embodiment for a manifold illustrating the effect of fluid boundary-layer separation. The air flow in this embodiment is the natural air flow that flows over a vehicle surface when the vehicle is moving. The use of the pressurized fluid directed through the manifold as described above provides a high velocity fluid flow. The supply of a high velocity fluid flow changes the boundary-layer separation that normally occur at these surfaces from the natural air flow that surrounds a vehicle in motion. This alteration of the natural air flow enables any road grim that may be built-up in these lower pressure areas to be removed using a pressurize fluid.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A substance removal system for removing at least one substance from a surface comprising:
    a first fluid source;
    a second fluid source;
    a selection means for selecting which of said first fluid source or said second fluid source is pressurized by said pressurizing means;
    a pressuring means for pressurizing a fluid to produce a pressurized fluid;
    a manifold with at least one input port for receiving said pressurized fluid thereinto and said manifold further comprising at least one output port for directing said pressurized fluid over said surface; and
    mounting means for mounting said manifold in close proximity to said surface whereby said pressurized fluid from said output port of said manifold directs said fluid over said surface so as to remove at least part of said substance on said surface.

2. The substance removal system of claim 1, wherein said substance comprises water.

3. The substance removal system of claim 2, wherein said fluid comprises air.

4. The substance removal system of claim 1, wherein said substance comprises road grim.

5. The substance removal system of claim 4, wherein said fluid is a cleaning solution.

6. The substance removal system of claim 5, wherein said cleaning solution contains antifreeze.

7. The substance removal system of claim 1, wherein said surface has a temperature; and said system further comprising:
    heating means wherein said fluid is heated to a temperature greater than the temperature of said surface.

8. The substance removal system of claim 1, wherein said surface comprises a face-shield on a helmet.

9. The substance removal system of claim 1, further comprising:
    a wiper arm with a wiper blade attached for wiping some of said substance form said surface; and
    mounting means for mounting said manifold to said wiper arm in close proximity to said surface whereby said output port of said manifold directs said fluid to flow across said surface so as to remove part at least part of said substance on said surface.

10. The substance removal system of claim 1, wherein said surface is surrounded by an air flow, whereby said air flow causes boundary-layer separation on at least part of said surface and said mounting means further comprising:

mounting means for mounting said manifold in close proximity to said surface whereby said pressurized fluid from said output port of said manifold changes said boundary-layer separation over said surface so as to remove part of said substance on said surface.

11. A method to remove at least one substance from a surface on a face-shield on a helmet comprising the steps of:

applying a force to a fluid to produce a stream of fluid;

mounting a manifold with at least one input port for receiving said pressurized fluid there into and said manifold further comprising at least one output port; and directing said pressurized fluid to flow over said surface, for causing said pressurized fluid to remove at least part of said substance from said surface.

12. The method to remove at least one substance from a surface of claim 11, wherein the step of pressurizing a fluid includes pressurizing air.

13. The method to remove at least one substance from a surface of claim 12, wherein the step of directing said pressurized fluid to flow over said surface removes any water deposited upon said surface.

14. The substance removal system of claim 11, wherein said step of applying a force to a fluid comprises pressurizing a cleaning solution and step of directing said pressurized fluid to flow over said surface removes any road grim deposited upon said surface.

15. The substance removal system of claim 11, wherein said step of applying a force to a fluid comprises pressurizing a cleaner solution with antifreeze.

16. The method to remove at least one substance from a surface of claim 11 wherein said surface is surrounded by an air flow, whereby said air flow causes boundary-layer separation on at least part of said surface and said step of mounting a manifold further comprising:

directing said pressurized fluid to flow over said surface so as to cause said pressurized fluid from said output port of said manifold to vary said boundary-layer separation over said surface so as to remove part of said substance on said surface.

17. The method to remove atr least one substance from a surface of claim 11, wherein said surface has a temperature; and further comprising the step of:

heating said fluid to a temperature greater than the temperature of said surface.

18. The method to remove at least one substance from a surface of claim 11, further comprising the steps of:

wiping some of said at least one substance from said surface using a wiper blade attached to a wiper arm; and mounting said manifold to said wiper arm in close proximity to said surface whereby said output port of said manifold direct said fluid to flow over said surface so as to remove some of at least part of said substance on said surface.

19. The method to remove at least one substance from a surface of claim 11, further comprising the steps:

keeping a first fluid in a first reservoir;

keeping a second fluid in a second reservoir; and selecting which of said first fluid or said second fluid is pressurized in said pressuring step.

* * * * *